J. F. CARROLL.
REINFORCED SPRING TIRE.
APPLICATION FILED JAN. 20, 1917.

1,243,259.

Patented Oct. 16, 1917.

Inventor,
Joseph F. Carroll,
by L. H. Hopper,
Atty.

UNITED STATES PATENT OFFICE.

JOSEPH F. CARROLL, OF LAKEWOOD, OHIO.

REINFORCED SPRING-TIRE.

1,243,259.  Specification of Letters Patent.  Patented Oct. 16, 1917.

Application filed January 20, 1917. Serial No. 143,460.

*To all whom it may concern:*

Be it known that I, JOSEPH F. CARROLL, of Lakewood, in the county of Cuyahoga and State of Ohio, have invented new and useful Improvements in Reinforced Spring-Tires, of which the following is a specification.

My present invention relates to vehicle tires; and its primary object is to produce a cushioning and resilient tire for vehicle wheels without using compressed air therein; and to adapt one or more coiled springs to a tire-casing and rim in such a manner that the said result will be accomplished practically, and a flattened tire on account of punctures rendered impossible. Further objects will be found in the peculiar construction of the coiled spring, in the means for securing the ends thereof together, and in the formation of the clencher-rim.

Minor objects will become apparent from the following description of embodiments of the invention illustrated in the accompanying drawing, in which—

The reference letter *a* indicates a clencher tire casing, which may be constructed of rubber and fabric in the usual, or any suitable way. For heavy service, or when desired for any other reason, the interior of the tread portion of the casing *a* may be reinforced and cushioned by cementing or vulcanizing thereto a lining *b* of resilient and flexible material, such as rubber and fabric.

Figure 1:
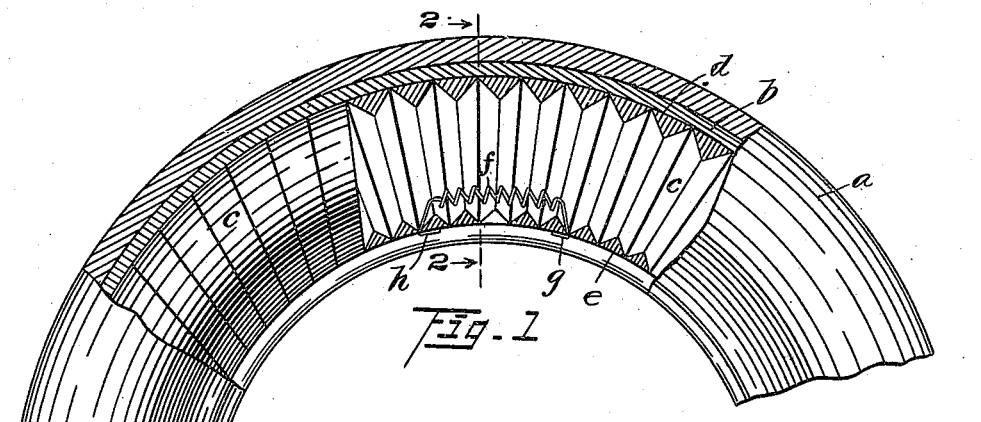
Figure 1 is a side view of a portion of a tire, partly broken away to a central section, and partly showing a side view of the interior springs.

A helically coiled spring *c* of steel, or other spring metal, is fitted to and inserted within the casing *a*, as shown. The cross-sections of the rod or wire wound to make the spring *c* are substantially that of isosceles triangles with the base sides outward, and the edges of the base slightly rounded so that they will not cut the casing. The said triangular rod is not uniform in size throughout, but is formed in equal and alternate heavier and lighter sections tapered one to the other, so that, when it is coiled into the spring *c*, the heavier sections *d* make the outer periphery, or tread side, of the spring, and the lighter sections *e* lie upon the inner side of the annular spring adjacent to the wheel, as plainly shown in Figs. 1 and 2. Thus, the convolutions of the spring *c* may fit close together, but, preferably, they are slightly separated when mounted upon a wheel; an almost continuous tubular surface is presented to the casing; and the metal of the spring is properly distributed for great strength coupled with light weight.

To secure the ends of the spring *c* together, welding and retempering of the spring ends, or other positive joint means may be resorted to, but I now prefer means having some elasticity, such as a spring-clamp *f*. The clamp *f* is a helically coiled wire spring having its ends flattened and bent over at an angle to the axis of its coil corresponding to the inner faces of the triangular rod of the spring *c* as plainly shown in Fig. 3. One end of the clamp may then be inserted between end convolutions of and on the inside of the spring *c*, and bent over the coil on the side next to the wheel as at *g*; after which the other end *h* of the clamp is pulled through between convolutions of the opposite end of the spring *c* and bent over against the said spring; thus forming opposing claws holding the ends of the spring *c* together by the tension of the spring-clamp *f*. The joint and the claws *g* and *h*, being on the inner side of the spring *c*, adjacent to the wheel, do not touch the casing *a*.

Figure 3:
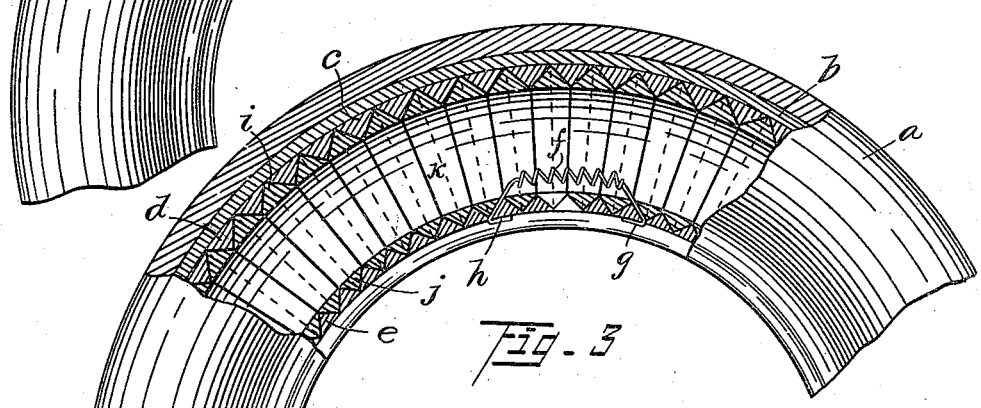
Fig. 3 is a side elevation of a part of a tire broken away to a central section, and showing a supplemental coiled spring therein.

In case the service required is too heavy for a single spring *c*, a smaller spring *k* with a corresponding pitch of convolutions may be screwed into it, as shown in Fig. 3. The rod of the spring *k* is also of isosceles triangular cross-section made to fit into the convolutions of spring *c*, and it is wound with the base face inward, instead of outward as in spring *c*. The supplementary spring *k* may also be reinforced by having heavier tread sections *i* and lighter wheel-side sections *j*, such as above described for the spring *c*, which both strengthens it and prevents its twisting.

Figures 2, 5:
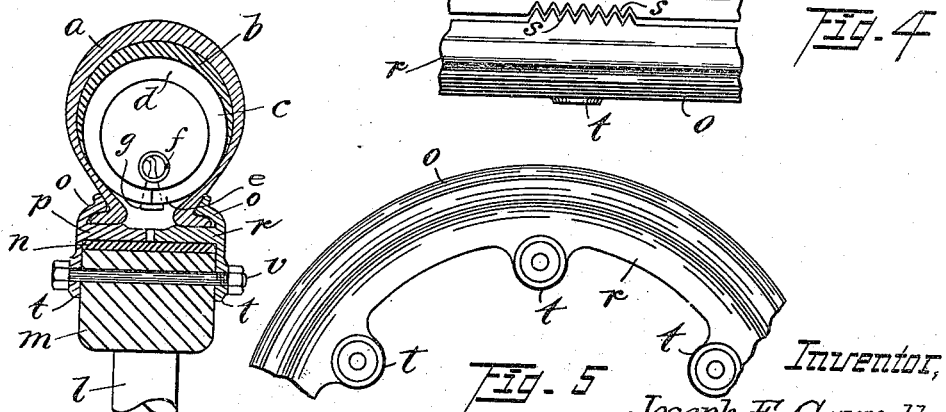
Fig. 2 is a cross-section taken on line 2—2 of Fig. 1, showing also a section of the rim and the felly of a wheel.
Fig. 5 is a side elevation of a portion of the clencher-rim.

In Fig. 2, *l* is a spoke, *m* is the felly, and *n* is the metal tire of an ordinary vehicle wheel; which are shown merely to illustrate a common type of wheel upon which my devices may be mounted.

Figure 4:
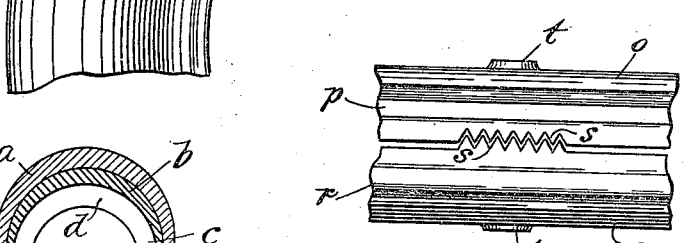
Fig. 4 is an outside view.

Since the ordinary one-piece clencher-rim cannot be used, I divide my rim centrally and circumferentially into two parts $r$ and $p$, each part being a hoop fitted to embrace the felly of the wheel, or its flat tire $n$ if the latter is employed. Each hoop $r$ and $p$ is provided with the usual peripheral and inwardly inclined clencher-flange $o$ to engage with and hold the outwardly turned inside edges of the casing $a$ respectively, as plainly shown in Fig. 2; and V-shaped serrations, as at $s$, Fig. 4, are formed at intervals on the inside edges of the rim sections $p$ and $r$ fitted to articulate together to prevent circumferential slipping of one section independently of the other. Flanged lugs $t$ may be formed on each rim-section to receive the fastening bolts $v$ passed horizontally through the felly $m$; or if preferred the usual rim clips may be used on one or both sides in lieu of said lugs; the purpose of the specific means employed being to clamp the complementary sections of the rim together, and thereby secure the tire upon the wheel.

I further point out and distinctly claim as my invention—

1. In a vehicle tire, a clencher-tire casing and means for securing it upon a wheel, and a helically coiled metallic spring formed of a rod having a triangular cross-section fitted closely within said casing, said spring rod having heavier cross-sections on the outer periphery of the spring than those of its inner circular parts more adjacent to the wheel.

2. In a vehicle tire, a clencher-tire casing and means for securing it upon a wheel, a helical spring within said casing bent to a circle concentric with the wheel and formed of a rod having a triangular cross-section coiled with its base side outward, and a reinforcing spring coiled to fit within the convolutions of the aforesaid spring.

3. In a vehicle tire, a clencher-tire casing and means for securing it upon a wheel, a helical spring within said casing formed of a rod having a triangular cross-section coiled with its base side outward, and a reinforcing spring coiled within the convolutions of the aforesaid spring, said reinforcing spring being formed of a rod having a triangular cross-section coiled with its base side inward.

4. In a vehicle tire, a clencher-tire casing and means for securing it upon a wheel, a helically coiled metallic spring fitted closely within said casing, and a spring-clamp having claws at each end adapted to be inserted between and to engage respectively opposite end convolutions of said spring to form a yielding joint in the latter.

In testimony whereof I affix my signature in the presence of two subscribing witnesses at Cleveland, Ohio, this 17th day of January, 1917.

JOSEPH F. CARROLL.

Witnesses:
Le Roy Mills,
E. Worthington.

Copies of this patent may be obtained for five cents each, by addressing the "Commissioner of Patents, Washington, D. C."